(12) United States Patent
Zhou (10) Patent No.: US 10,493,859 B2
(45) Date of Patent: Dec. 3, 2019

(54) STATION WITH LOOP CONFIGURATION FOR HYPERLOOP TRANSPORTATION SYSTEM

(71) Applicant: HYPERLOOP TRANSPORTATION TECHNOLOGIES, INC., Culver (CA)

(72) Inventor: Yayun Zhou, Marina Del Rey, CA (US)

(73) Assignee: HYPERLOOP TRANSPORTATION TECHNOLOGIES, INC., Culver City, CA (US)

( * ) Notice: Subject to any disclaimer, the term of this patent is extended or adjusted under 35 U.S.C. 154(b) by 298 days.

(21) Appl. No.: 15/600,189

(22) Filed: May 19, 2017

(65) Prior Publication Data
US 2017/0334312 A1 Nov. 23, 2017

Related U.S. Application Data

(60) Provisional application No. 62/339,069, filed on May 19, 2016.

(51) Int. Cl.
| | | |
|---|---|---|
| *B60L 13/08* | (2006.01) | |
| *B23K 31/02* | (2006.01) | |
| *B61B 1/02* | (2006.01) | |
| *B61B 13/08* | (2006.01) | |
| *B61B 13/10* | (2006.01) | |
| *E01B 25/30* | (2006.01) | |
| *B60L 13/00* | (2006.01) | |
| *B60L 13/10* | (2006.01) | |
| *B23P 11/02* | (2006.01) | |
| *B23P 15/20* | (2006.01) | |
| *B61L 25/02* | (2006.01) | |
| *B65G 67/60* | (2006.01) | |

(52) U.S. Cl.
CPC ............ *B60L 13/08* (2013.01); *B23K 31/027* (2013.01); *B60L 13/003* (2013.01); *B60L 13/10* (2013.01); *B61B 1/02* (2013.01); *B61B 13/08* (2013.01); *B61B 13/10* (2013.01); *E01B 25/30* (2013.01); *B23P 11/025* (2013.01); *B23P 15/20* (2013.01); *B61L 25/021* (2013.01); *B65G 67/603* (2013.01)

(58) Field of Classification Search
CPC ........ B60L 13/08; B60L 13/003; B60L 13/10; B23K 31/027; B61B 1/02; B61B 13/08; B61B 13/10; E01B 25/30
See application file for complete search history.

(56) References Cited

U.S. PATENT DOCUMENTS

| | | | | |
|---|---|---|---|---|
| 3,865,041 A | * | 2/1975 | Bacon ..................... | B61B 13/00 104/18 |
| 9,290,187 B2 | * | 3/2016 | Dalrymple ............. | B61B 13/10 |

(Continued)

*Primary Examiner* — Jason C Smith
(74) *Attorney, Agent, or Firm* — Lucas & Mercanti, LLP (57) ABSTRACT

A station for a hyperloop transportation system includes a tube comprising a low-pressure environment, a plurality of tracks within the tube, each track adapted to carry a hyperloop capsule, and a turntable joined to an end of the tube, adapted to rotate a capsule one hundred and eighty degrees. The station also includes a platform disposed on a side of the tube, adapted to hold a plurality of people, and a plurality of gates disposed in one side of the tube. Each gate includes a door forming a barrier between the low-pressure environment of the tube and an exterior of the tube, and a sealing mechanism adapted to form a seal with a hyperloop capsule.

5 Claims, 10 Drawing Sheets

(56) References Cited

U.S. PATENT DOCUMENTS

| | | | |
|---|---|---|---|
| 9,511,959 B2* | 12/2016 | Bambrogan | B61B 13/10 |
| 9,566,987 B2* | 2/2017 | Coutre | B61B 13/10 |
| 9,599,235 B2* | 3/2017 | Cothern | B61B 13/10 |
| 9,641,117 B2* | 5/2017 | Jetti | H02P 25/06 |
| 2013/0136546 A1* | 5/2013 | Friedmann | B60L 13/04 |
| | | | 406/181 |
| 2017/0334312 A1* | 11/2017 | Zhou | B23K 31/027 |

* cited by examiner

STATION WITH LOOP CONFIGURATION FOR HYPERLOOP TRANSPORTATION SYSTEM

This application claims priority to Provisional Application Ser. No. 62/339,069 filed May 19, 2016, the entirety of which is incorporated herein by reference.

BACKGROUND

Terrestrial passenger and freight travel still rely on modes of transportation developed in the nineteenth and early twentieth centuries. A person wishing to travel long distances over land is limited to using an automobile or a train. Freight transport faces the same limitations. Although high speed trains can now travel more than 300 miles per hour, travelling by either automobile or train is still far slower than travel by air. There is a need for improved and faster modes of terrestrial transportation.

SUMMARY

In accordance with an embodiment, a station for a hyperloop transportation system is provided. The station includes a platform adapted to hold a plurality of people waiting to enter a hyperloop capsule, the platform having a rounded shape with a rounded edge, a tube comprising a low-pressure environment, and a plurality of tracks disposed within the tube, each of the tracks being adapted to carry a hyperloop capsule. The tube enters the station on a side of the station, carrying capsule traffic moving toward the station, follows a path around the rounded edge of the platform, and exits the station on the same side of the station on which the tube enters, carrying capsule traffic moving away from the station. The station also includes a plurality of gates disposed in one side of the tube, each gate comprising a door forming a barrier between the low-pressure environment of the tube and an exterior of the tube, and a sealing mechanism adapted to form a seal with a hyperloop capsule.

In one embodiment, the station includes three tracks within the tube.

In another embodiment, the station includes the following three tracks: a first track for use by capsules docking at one or more gates, a second track for use by malfunctioning capsules, and a third track for express movement.

In another embodiment, the low-pressure environment within the tube is a vacuum.

In another embodiment, each gate includes first and second doors forming a barrier between the low-pressure environment of the tube and an exterior of the tube, and a sealing mechanism adapted to form a seal with a hyperloop capsule.

In another embodiment, the sealing mechanism includes a component having a curved surface that conforms to the shape of the exterior surface of the hyperloop capsule.

In accordance with another embodiment, a method of transporting people is provided. A capsule adapted to hold a plurality of people is moved through a tube using magnetic levitation. The capsule docks at a gate disposed in a side of the tube. A component of the gate is caused to form a seal with a surface of the capsule. A door is opened in the gate, and people are allowed to enter the capsule.

DETAILED DESCRIPTION

A hyperloop system is a mode of passenger and freight transportation that propels a capsule-like vehicle through a reduced-pressure tube that would exceed airliner speed. The capsules accelerate to cruising speed gradually using a linear electric motor and glide above their track using passive magnetic levitation. The tubes can go above ground on columns or underground, eliminating the dangers of grade crossings. The system is highly energy-efficient, quiet and autonomous.

In accordance with an embodiment, a hyperloop system includes one or more tubes and one or more capsules adapted to travel through the tubes.

Figure 1:
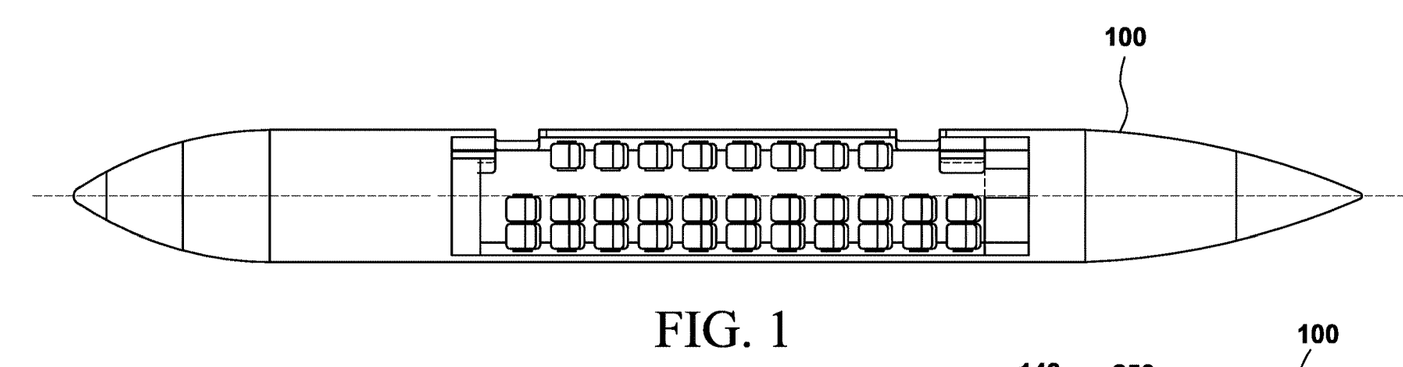
FIG. 1 shows a capsule in accordance with an embodiment.

FIG. 1 shows a capsule in accordance with an embodiment. In the illustrative embodiment, capsule 100 has a length of about 26 meters; however, other lengths may be used.

Figure 2:
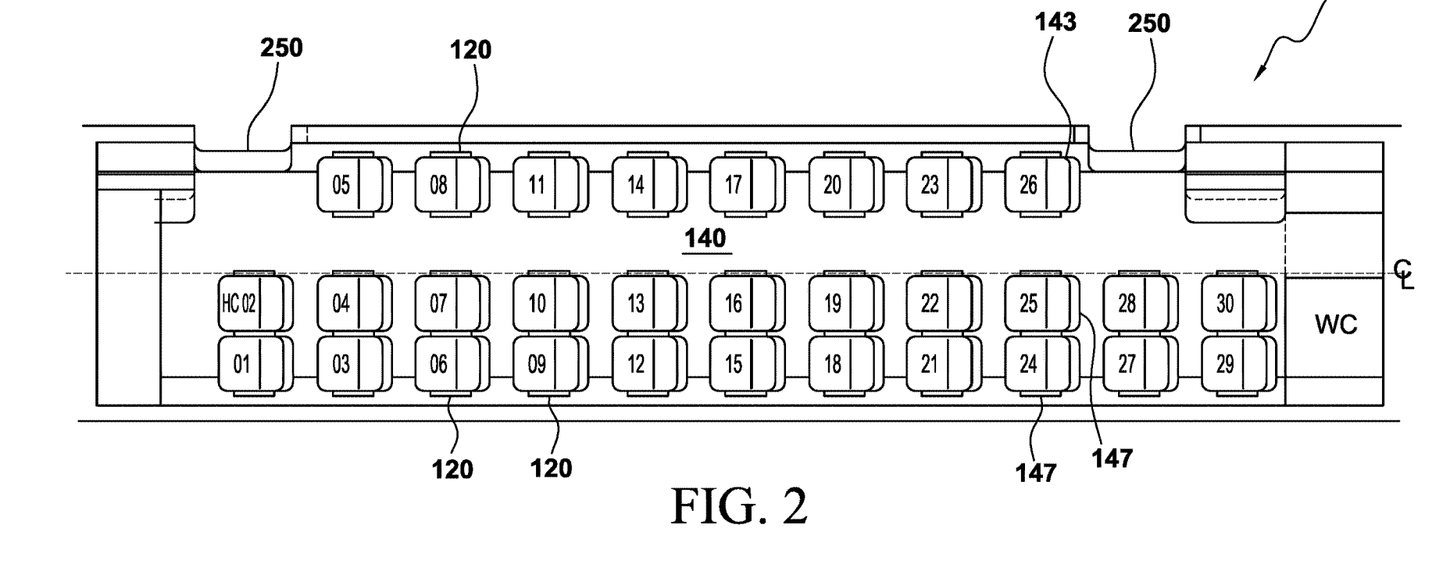
FIG. 2 shows the interior of a capsule in accordance with an embodiment.

FIG. 2 shows the interior of a capsule in accordance with an embodiment. Capsule 100 has two doors 250 disposed on one side of the capsule. In the illustrative embodiment, the distance d from the center of a first door 250 to the center of the second door 250 is 8.311 meters. Other distances may be used.

Capsule 100 contains a plurality of seats 120. In the illustrative embodiment, capsule 100 contains thirty (30) seats. Capsule 100 has an aisle 140; each row includes a single seat disposed on one side of aisle 140 and two seats disposed on the other side of aisle 140.

In other embodiments, capsule 100 may include more or fewer than thirty (30) seats. For example, a capsule may have up to one hundred (100) seats and thus may hold up to one hundred persons.

Figure 3:
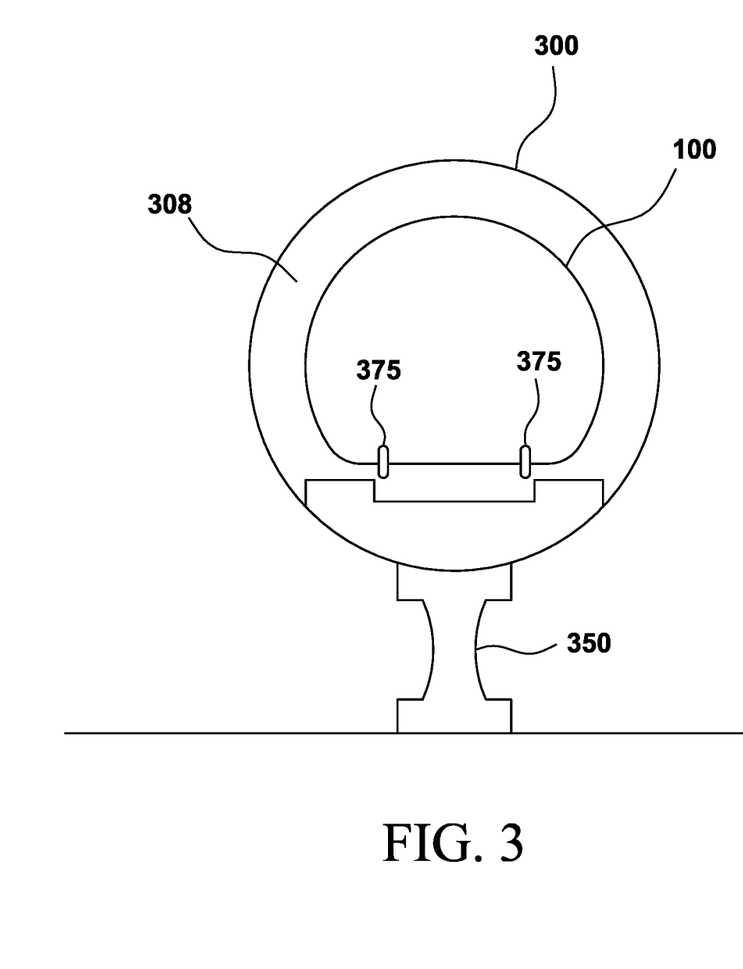
FIG. 3 shows a cross section of a tube and a capsule within the tube in accordance with an embodiment.

FIG. 3 shows a cross section of a tube 300 and a capsule 100 within the tube in accordance with an embodiment. Tube 300 is supported by a plurality of pylons 350. Tube 300 may be above-ground or underground.

At least a portion of capsule 100 has a rounded, curved exterior surface. For example, the side and top of capsule may have a rounded, curved form. The surface may have a circular, semi-circular, oval, or other type of rounded surface.

An interior 308 of tube 300 is maintained at a vacuum or at low pressure. Capsule 100 moves through tube 300 using magnetic levitation technology.

Capsule 100 has wheels 375. Wheels 375 are unused when capsule 100 is powered magnetic levitation. When magnetic levitation is not used, capsule 100 may use wheels 375. For example, in one embodiment, magnetic levitation is used at speeds above about 20 miles per hour, and wheels are used at speeds below about 20 miles per hour. For example, magnetic levitation may be used between stations, while wheels 375 may be used when capsule 100 is at or near a station.

Figure 4:
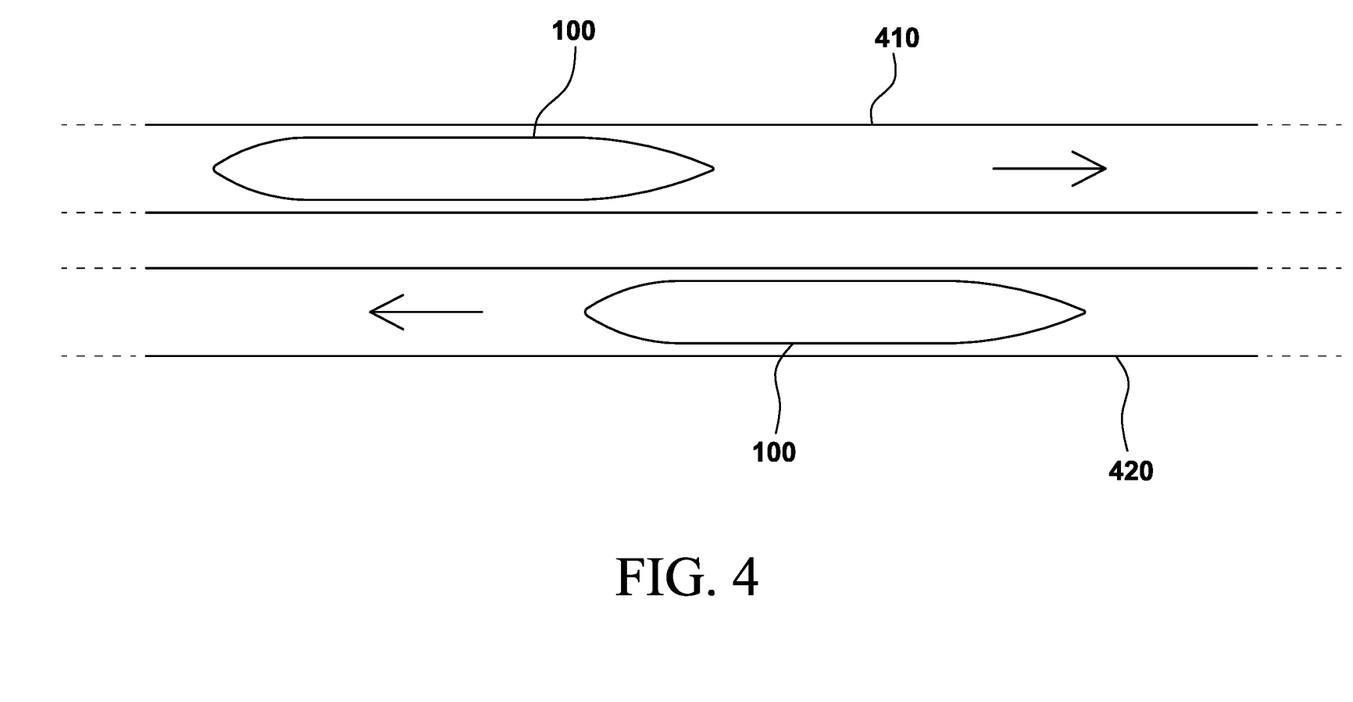
FIG. 4 shows a first tube positioned next to a second tube in accordance with an embodiment.

In accordance with an embodiment shown in FIG. 4, a first tube 410 is positioned next to a second tube 420. First tube 410 carries traffic in a first direction. Second tube 420 carries traffic in the opposite direction.

Figure 5A:
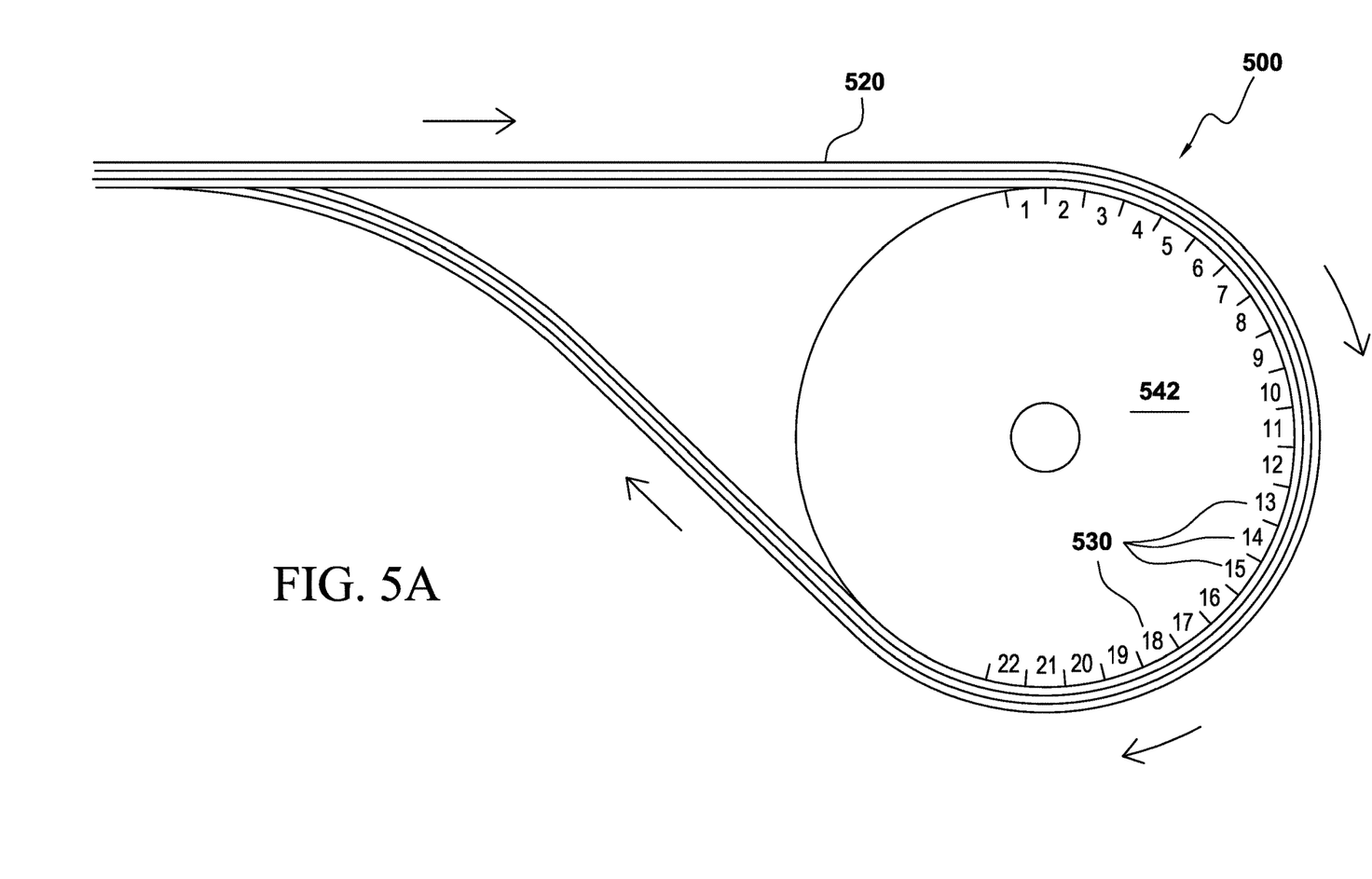
FIG. 5A shows a station having a loop configuration in accordance with an embodiment.

In accordance with an embodiment, passengers board capsules and exit capsules at a station. FIG. 5A shows a station having a loop configuration in accordance with an embodiment. Station 500 includes a plurality of tracks 520, a platform 542, and a plurality of gate areas 530. Platform 542 may be have a circular, semi-circular, oval, or other round shape. Platform 542 has a rounded edge adjacent to tube 590. Tracks 520 enter the station from one side of the station, with traffic moving toward the station, follow a loop around an edge of platform 542, and exit the station on the same side from which they entered, but with traffic moving away from the station. In the illustrative embodiment, the gate areas 530 are numbered 1-22.

Figure 5B:
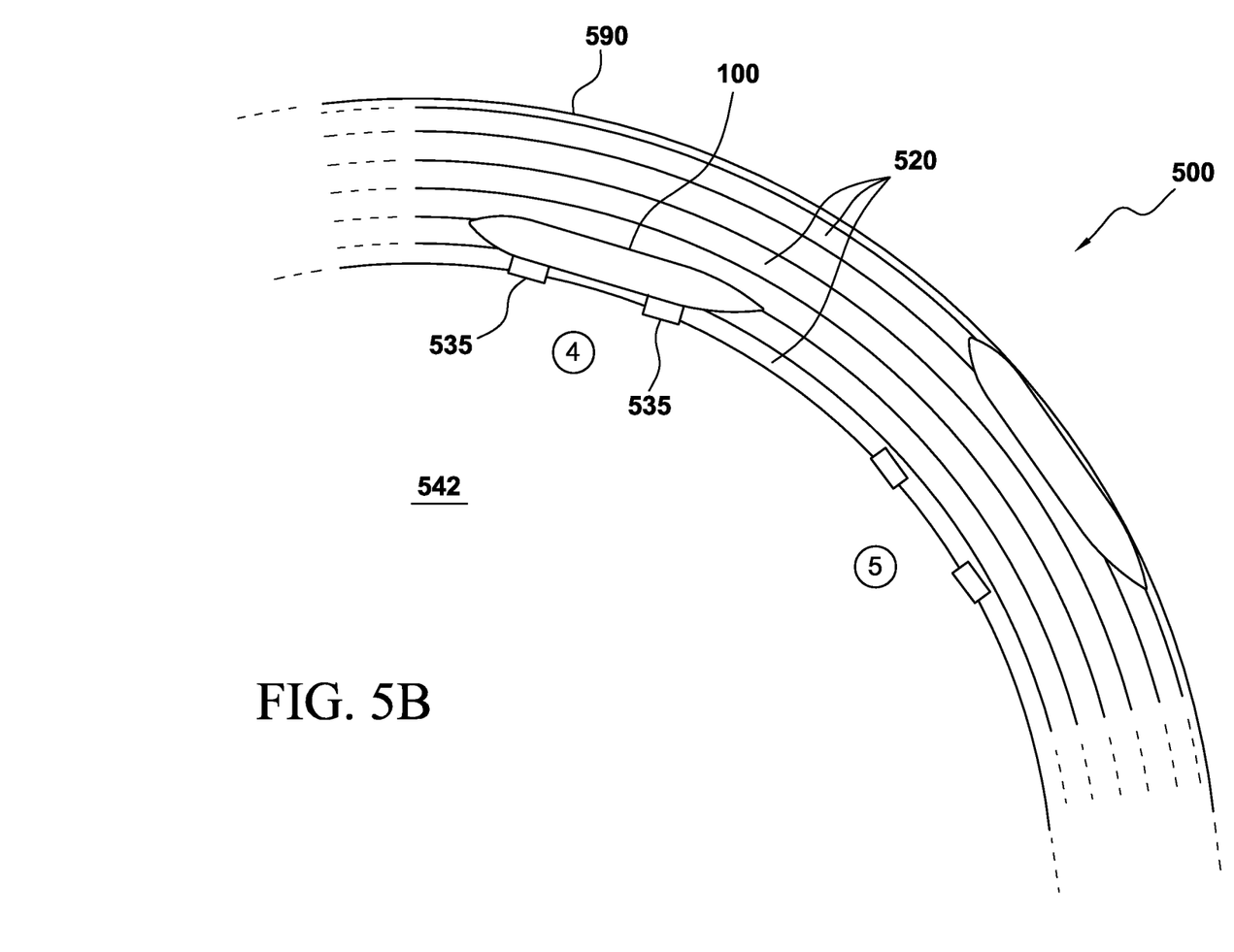
FIG. 5B shows a portion of a station in accordance with an embodiment.

FIG. 5B shows a portion of station 500 in greater detail in accordance with an embodiment. In particular, FIG. 5B shows gate areas 4 and 5 and the tracks adjacent thereto. A tube 590 containing tracks 520 loops around platform 542. A low-pressure environment (which may be a vacuum) is maintained within tube 590. Gates 535 disposed in a side of tube 590 provide passage from platform 542 into tube 590.

In the illustrative embodiment of FIG. 5A, tube 590 contains three tracks 520; however, in other embodiments, a tube may contain more or fewer than three tracks.

Gates are arranged in pairs. The distance between a pair of gates corresponds to the distance d equal to the distance between doors of a capsule 100. This arrangement allows easy docking, boarding, and deboarding by passengers. For example, in the illustrative embodiment of FIG. 5B, a capsule 100 is docked at gates 535 in gate area 4.

In one embodiment, selected gates are designated as arrival gates and other selected gates are designated as departure gates. For example, in the illustrative embodiment of FIG. 5B, gates 535 may be designated as arrival gates while other gates may be designated as departure gates.

When a capsule docks at gate 535, the gates serves to connect the environment of the platform 542 with the pressurized environment within the capsule. Accordingly, each gate includes a docking mechanism adapted to produce a sealed connection with the docked capsule, and multiple doors or gates for safety.

The loop configuration of station 500 advantageously allows capsules to approach the station, stop at a gate area, and then depart in the same direction, without the need to turn around. For example, referring again to FIG. 5A, the portion of tube 590 carrying departing capsules may be disposed next to the portion of the tube carrying incoming capsules. This facilitates a continuous, uninterrupted flow of traffic into and out of the station.

Figure 5C:
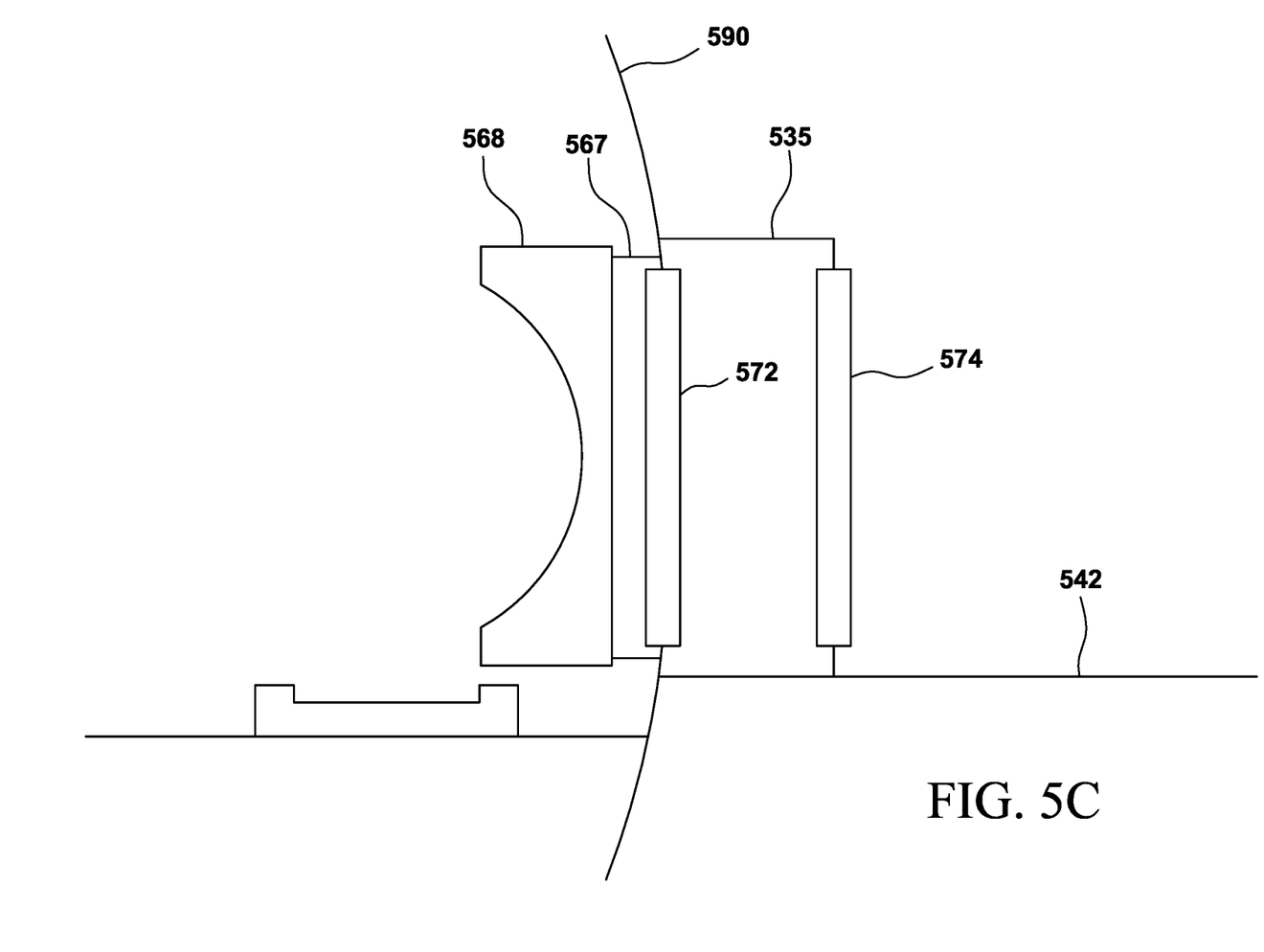
FIG. 5C shows a tube, a gate, and a platform in accordance with an embodiment.

FIG. 5C shows a tube, a gate, and a platform in accordance with an embodiment. Tube 590 contains one or more tracks 511. Tube 590 contains a low-pressure environment (which may be a vacuum). Platform 542 is a platform adapted to hold a plurality of people who may be waiting for a capsule, or who may be leaving a capsule. The environment on platform 542 is either an ambient environment open to the outside or a controlled indoor environment such as that of a train station. Gate 535 includes two doors 572, 574, which provide a barrier between the low-pressure environment of tube 590 and the environment of platform 542. Door 574 opens onto platform 542.

Gate 535 includes a docking mechanism 568 having a curved surface 569 adapted to conform to the exterior surface of a capsule. Docking mechanism 568 is mounted on an extendable component 567 that has a retracted position (shown in FIG. 5B) and an extended position.

Figure 5D:
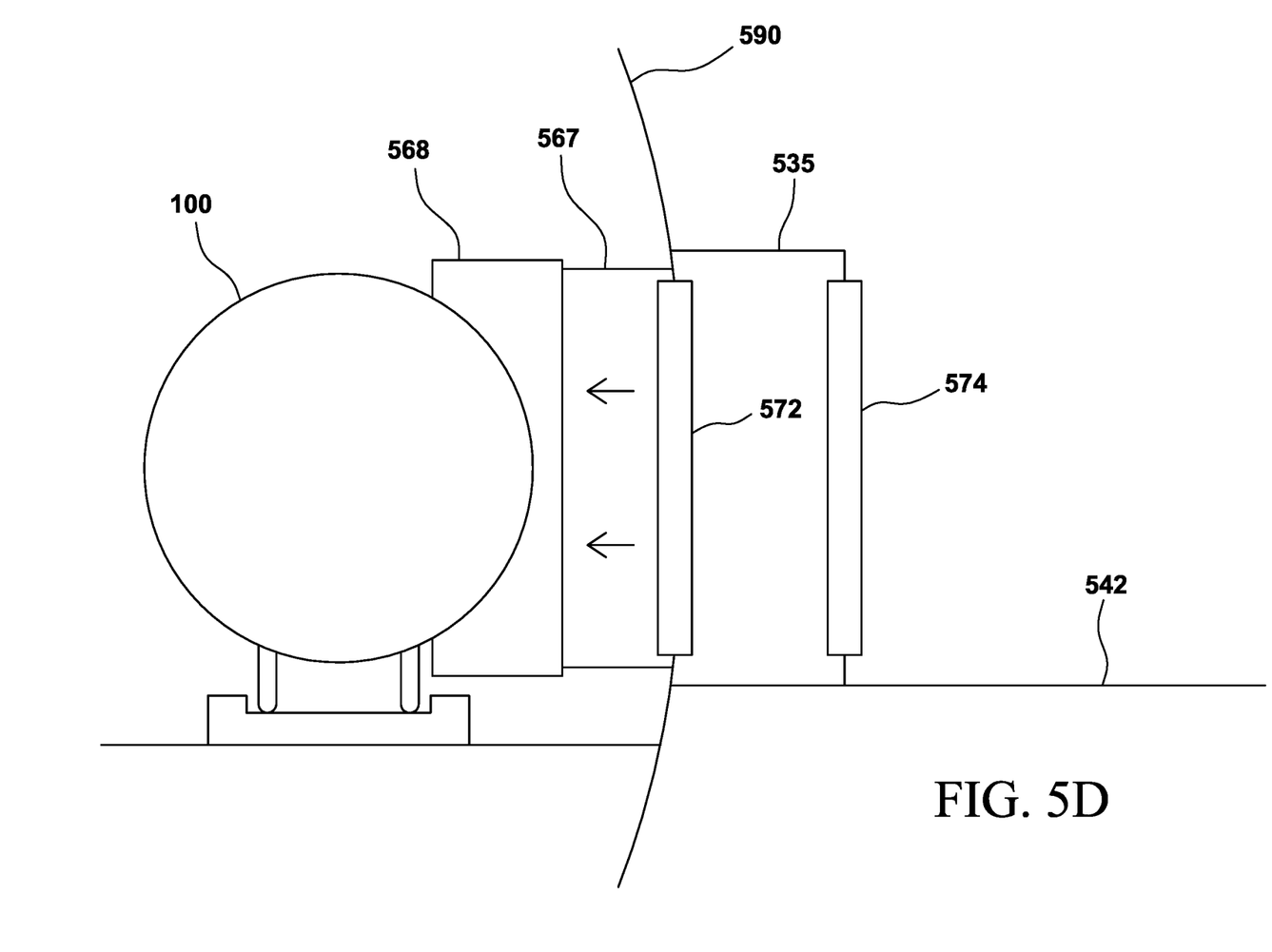
FIG. 5D shows a capsule docked at a gate in accordance with an embodiment.

Referring to FIG. 5D, when a capsule arrives at gate 535, extendable component 567 expands and extends away from the side of tube 590, causing docking mechanism 568 to contact the exterior surface of capsule 100 and to form a seal with the surface of the capsule. FIG. 5D shows capsule 100 docked at gate 535 in accordance with an embodiment. Capsule 100 is within tube 590 and is docked at gate 535. Docking mechanism 568 is in contact with the exterior surface of capsule 100 and forms a seal with the outer surface of capsule 100. After docking mechanism 568 has formed a seal with the exterior surface of capsule 100, the door(s) of capsule 100 may open and people may pass between platform 542 and the interior of capsule 100.

Figure 6:
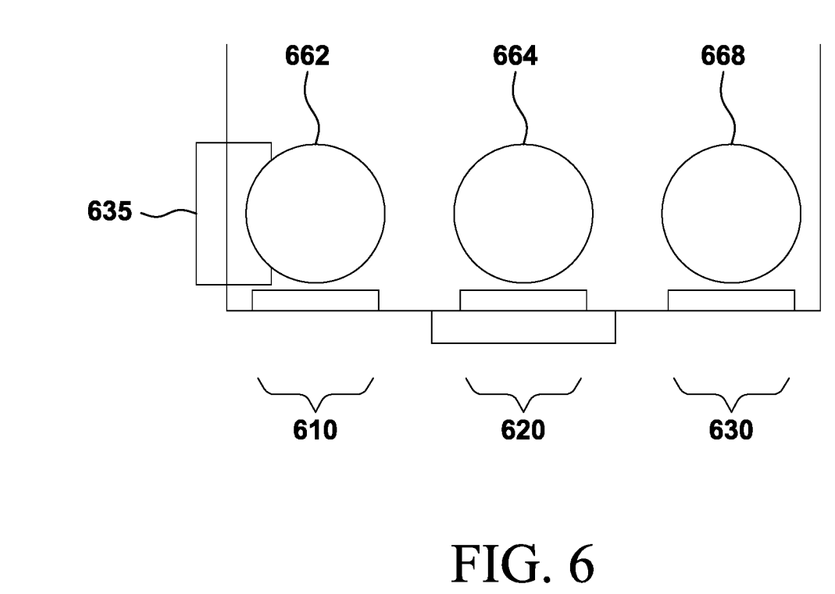
FIG. 6 shows a three-track configuration in accordance with an embodiment.

In one embodiment, three tracks are used at or near a station. FIG. 6 shows a three-track configuration in accordance with an embodiment. Docking track 610 is used for docking. Thus, capsule 662 is docked at gateway 635. Express track 630 is used as an express track. Thus capsule 668 is moving in the express track without interruption. Maneuvering track 620 is used for capsules that malfunction. Such capsules, such as capsule 664, are moved to a maintenance facility for repair.

Within a predetermined distance from a station, three tracks may be disposed within a single tube, such as tube 300.

Figure 7:
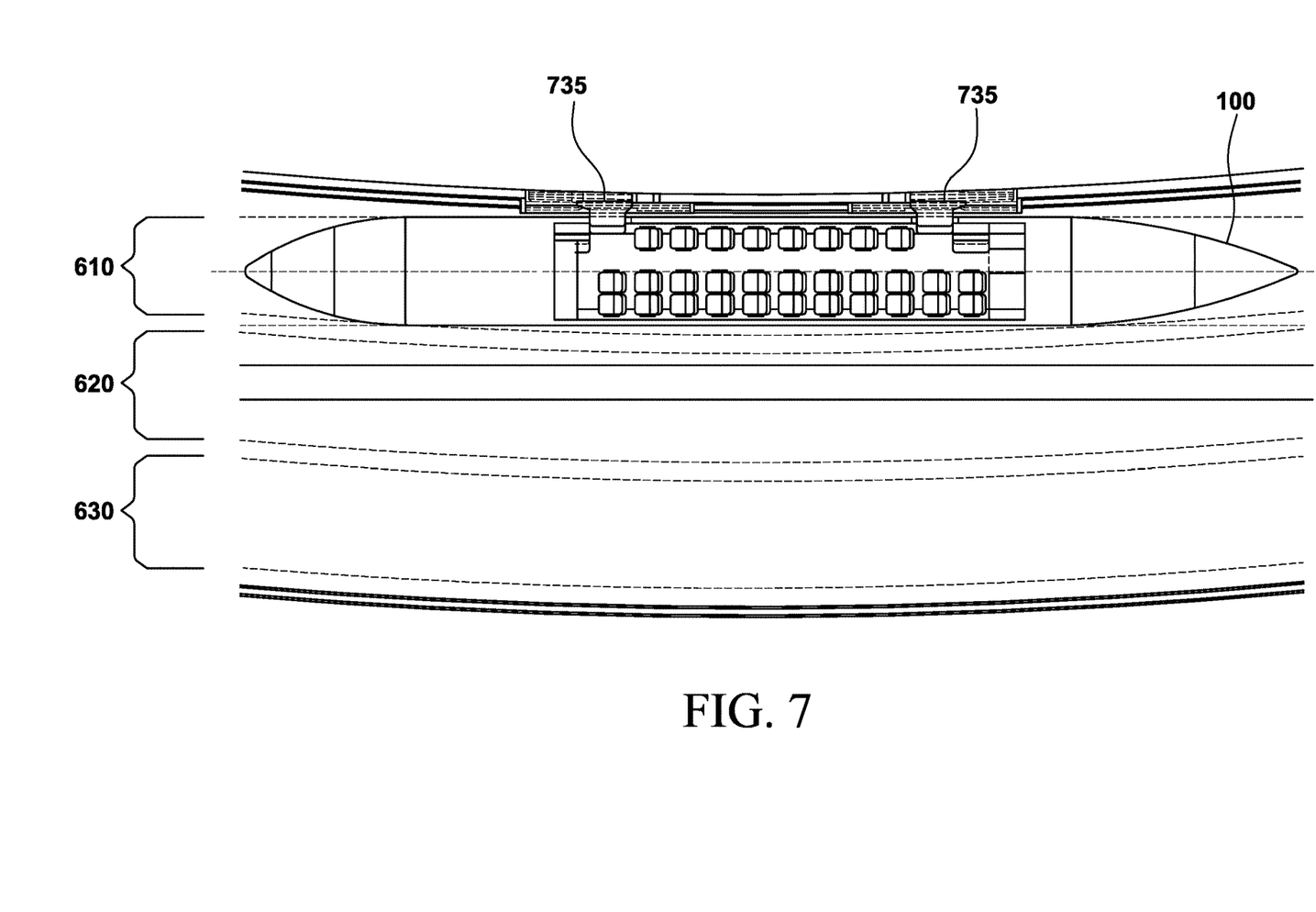
FIG. 7 shows a capsule docked at a pair of gates in accordance with an embodiment.

FIG. 7 shows a capsule 100 docked at a pair of gates 735 in accordance with an embodiment. Capsule 100 is in docking track 610. Maneuvering track 620 is adjacent docking track 610; express track 630 is adjacent maneuvering track 620.

Figure 8A:
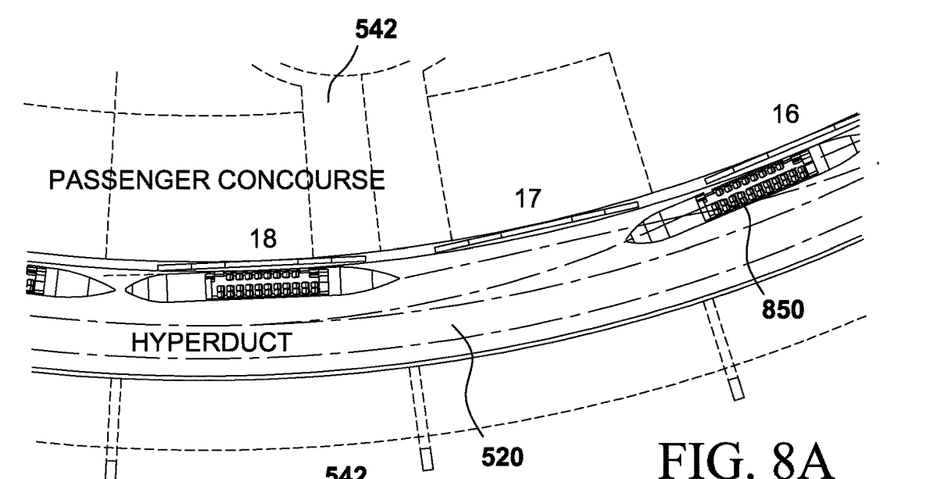
FIG. 8A-8C shows movement of capsules on tracks in a station in accordance with an embodiment.
Figure 8B:
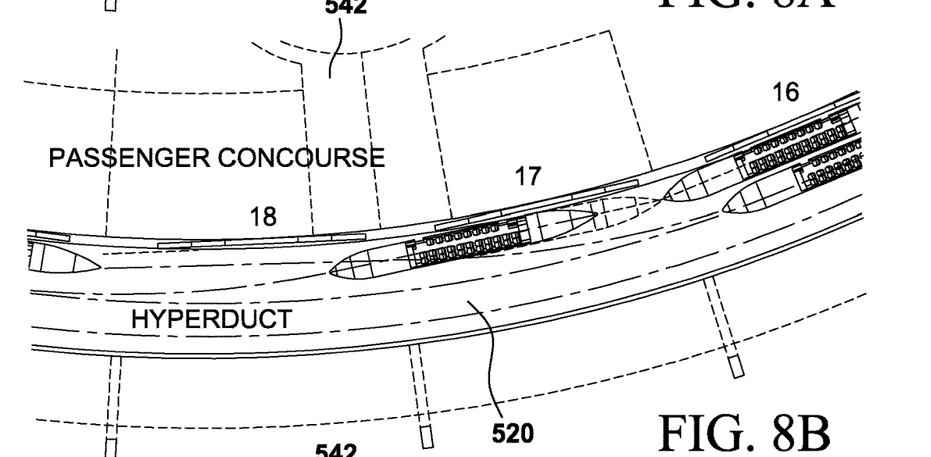
Figure 8C:
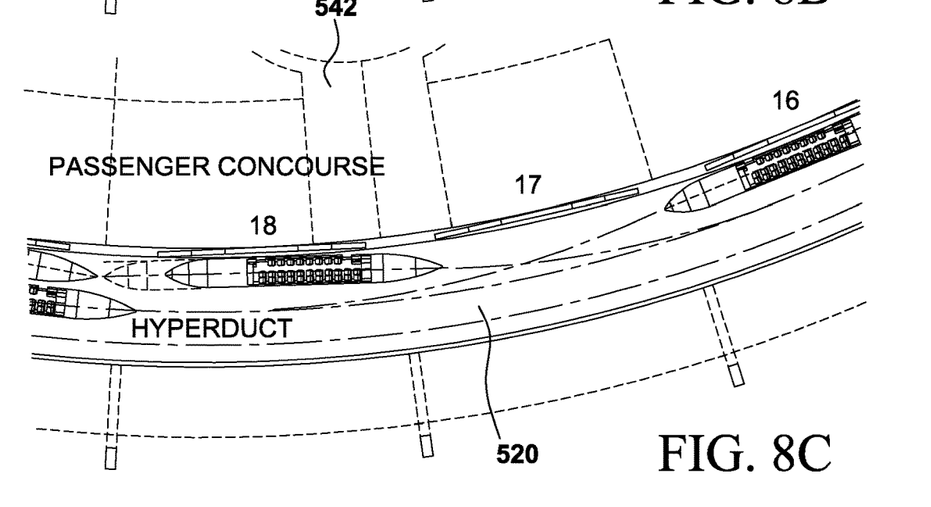

FIG. 8A-8C shows movement of a plurality of capsules on tracks in a station in accordance with an embodiment. A capsule in the docking track, such as capsule 850 shown FIG. 8A, changes tracks based on a tangent line method. A circle is determined based on the track in which the capsule is currently positioned. Thus, referring to FIG. 8A, a circle may be determined based on the curvature of the docking track in which capsule 850 is located. A point representing the center of capsule 850 is identified; the point also lies on the circle. A tangent line intersecting the circle at the center point of capsule 850 is determined. When capsule leaves the docking track in order to move to a second track, the capsule follows the tangent line until the capsule is in the desired second track. A similar tangent line method may be used to determine a trajectory for capsule 870 in FIG. 8B and a trajectory for capsule 880 in FIG. 8C, for example.

In accordance with another embodiment, a method of transporting people is provided. A capsule adapted to hold a plurality of people is moved through a tube using magnetic levitation. The capsule docks at a gate disposed in a side of the tube. A component of the gate is caused to form a seal with a surface of the capsule. A door is opened in the gate, and people are allowed to enter the capsule. People may also leave the capsule.

In accordance with an embodiment, a station for a hyperloop transportation system is provided. The station includes a platform adapted to hold a plurality of people waiting to enter a hyperloop capsule, the platform having a rounded shape with a rounded edge, a tube comprising a low-pressure environment, and a plurality of tracks disposed within the tube, each of the tracks being adapted to carry a hyperloop capsule. The tube enters the station on a side of the station, carrying capsule traffic moving toward the station, follows a path around the rounded edge of the platform, and exits the station on the same side of the station on which the tube enters, carrying capsule traffic moving away from the station. The station also includes a plurality of gates disposed in one side of the tube, each gate comprising a door forming a barrier between the low-pressure environment of the tube and an exterior of the tube, and a sealing mechanism adapted to form a seal with a hyperloop capsule.

In one embodiment, the station includes three tracks within the tube.

In another embodiment, the station includes the following three tracks: a first track for use by capsules docking at one or more gates, a second track for use by malfunctioning capsules, and a third track for express movement.

In another embodiment, the low-pressure environment within the tube is a vacuum.

In another embodiment, each gate includes first and second doors forming a barrier between the low-pressure environment of the tube and an exterior of the tube, and a sealing mechanism adapted to form a seal with a hyperloop capsule.

In another embodiment, the sealing mechanism includes a component having a curved surface that conforms to the shape of the exterior surface of the hyperloop capsule.

In accordance with another embodiment, a method of transporting people is provided. A capsule adapted to hold a plurality of people is moved through a tube using magnetic levitation. The capsule docks at a gate disposed in a side of the tube. A component of the gate is caused to form a seal with a surface of the capsule. A door is opened in the gate, and people are allowed to enter the capsule.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A station for a hyperloop transportation system comprising:
   a platform adapted to hold a plurality of people waiting to enter a hyperloop capsule, the platform having a rounded shape with a rounded edge;
   a tube comprising a low-pressure environment;
   a plurality of gates disposed in one side of the tube, each gate comprising a door forming a barrier between the low-pressure environment of the tube and an exterior of the tube, and a sealing mechanism adapted to form a seal with a hyperloop capsule; and
   a plurality of tracks disposed within the tube, each of the tracks being adapted to carry a hyperloop capsule, the plurality of tracks comprising:
      a first track for use by hyperloop capsules docking at one or more gates;
      a second track for use by malfunctioning hyperloop capsules; and
      a third track for express movement;
   wherein the tube enters the station on a side of the station, carrying capsule traffic moving toward the station, follows a path around the rounded edge of a platform, and exits the station on the same side of the station on which the tube enters, carrying capsule traffic moving away from the station.

2. The station of claim 1, wherein the low-pressure environment is a vacuum.

3. The station of claim 1, wherein each gate comprises:
   first and second doors forming a barrier between the low-pressure environment of the tube and an exterior of the tube; and
   a sealing mechanism adapted to form a seal with a hyperloop capsule.

4. The station of claim 3, wherein the sealing mechanism is a component having a curved surface that conforms to the shape of the exterior surface of the hyperloop capsule.

5. A method of transporting people, the method comprising:
   moving a capsule adapted to hold a plurality of people on a selected track through a tube using magnetic levitation, the tube including a plurality of tracks disposed within the tube, each of the tracks being adapted to carry a hyperloop capsule, the plurality of tracks comprising a first track for use by hyperloop capsules docking at one or more gates, a second track for use by malfunctioning hyperloop capsules, and a third track for express movement;
   moving the capsule to the first track when the capsule approaches a gate disposed in a side of the tube;
   docking the capsule at the gate, while the capsule is on the first track;
   causing a component of the gate to form a seal with a surface of the capsule;
   opening a door in the gate;
   allowing people to enter the capsule;
   moving the capsule to the third track; and
   moving the capsule in an express movement mode, while the capsule is on the third track.

\* \* \* \* \*